(12) United States Patent
Parker, Jr. et al.

(10) Patent No.: US 8,909,040 B1
(45) Date of Patent: Dec. 9, 2014

(54) METHOD AND APPARATUS OF MULTIPLEXING AND ACQUIRING DATA FROM MULTIPLE OPTICAL FIBERS USING A SINGLE DATA CHANNEL OF AN OPTICAL FREQUENCY-DOMAIN REFLECTOMETRY (OFDR) SYSTEM

(71) Applicant: The United States as Represented by the Administrator of NASA, Washington, DC (US)

(72) Inventors: Allen R Parker, Jr., Lancaster, CA (US); Hon Man Chan, Canyon Country, CA (US); Anthony (Nino) Piazza, Palmdale, CA (US); William Lance Richards, Palmdale, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 153 days.

(21) Appl. No.: 13/759,210

(22) Filed: Feb. 5, 2013

(51) Int. Cl.
*H04B 10/08* (2006.01)
*H04B 17/00* (2006.01)
*H04J 14/02* (2006.01)
*H04B 10/071* (2013.01)
*G02B 6/35* (2006.01)

(52) U.S. Cl.
CPC .............. *H04B 10/071* (2013.01); *G02B 6/35* (2013.01)
USPC ................................ 398/25; 398/87

(58) Field of Classification Search
USPC ......................... 398/20, 25, 82, 87
See application file for complete search history.

(56) References Cited

U.S. PATENT DOCUMENTS

| 4,770,535 | A | 9/1988 | Kim et al. |
|---|---|---|---|
| 5,680,489 | A * | 10/1997 | Kersey ............................ 385/12 |
| 6,640,647 | B1 * | 11/2003 | Hong et al. ..................... 73/800 |
| 7,157,693 | B2 * | 1/2007 | Thingbo et al. .......... 250/227.18 |
| 7,167,647 | B2 * | 1/2007 | Eldada et al. ................... 398/33 |
| 7,379,168 | B2 | 5/2008 | Froggatt et al. |
| 7,440,087 | B2 | 10/2008 | Froggatt |

(Continued)

OTHER PUBLICATIONS

Luna Technologies web page at http://www.lunatechnologies.com/technology/distributed-sensing.html.
Jiang M, Chen D, He S, "Multiplexing Scheme of Long-Period Grating Sensors Based on a Modified Optical Frequency Domain Reflectometry," IEEE Photonics Technology Letters, 20(21-24), 1962-1964, Nov.-Dec. 2008.

(Continued)

*Primary Examiner* — Dalzid Singh
(74) *Attorney, Agent, or Firm* — Mark Homer

(57) ABSTRACT

A method and system for multiplexing a network of parallel fiber Bragg grating (FBG) sensor-fibers to a single acquisition channel of a closed Michelson interferometer system via a fiber splitter by distinguishing each branch of fiber sensors in the spatial domain. On each branch of the splitter, the fibers have a specific pre-determined length, effectively separating each branch of fiber sensors spatially. In the spatial domain the fiber branches are seen as part of one acquisition channel on the interrogation system. However, the FBG-reference arm beat frequency information for each fiber is retained. Since the beat frequency is generated between the reference arm, the effective fiber length of each successive branch includes the entire length of the preceding branch. The multiple branches are seen as one fiber having three segments where the segments can be resolved. This greatly simplifies optical, electronic and computational complexity, and is especially suited for use in multiplexed or branched OFS networks for SHM of large and/or distributed structures which need a lot of measurement points.

6 Claims, 4 Drawing Sheets

(56) References Cited

U.S. PATENT DOCUMENTS 7,538,860 B2 * 5/2009 Moore .................. 356/35.5
7,772,541 B2 8/2010 Froggatt
2011/0273719 A1 11/2011 Froggatt

OTHER PUBLICATIONS

B. Childers et al., "Use of 3000 Bragg Grating Strain Sensors Distributed on Four Eight-Meter Optical Fibers During Static Load Tests of a Composite Structure," Proc. of SPIE, 4332, 133-142 (2001).

* cited by examiner

METHOD AND APPARATUS OF MULTIPLEXING AND ACQUIRING DATA FROM MULTIPLE OPTICAL FIBERS USING A SINGLE DATA CHANNEL OF AN OPTICAL FREQUENCY-DOMAIN REFLECTOMETRY (OFDR) SYSTEM

STATEMENT OF GOVERNMENT RIGHTS

The invention described herein may be manufactured and used by or for the Government of the United States of America for governmental purposes without payment of any royalties thereon or therefor.

BACKGROUND OF THE INVENTION

1. Field of the Invention

The present invention relates to optical fiber sensing systems and, more specifically, to a method and system for multiplexing a network of parallel fiber Bragg grating (FBG) sensor-fibers to a single acquisition channel of a closed Michelson interferometer system via a fiber splitter by distinguishing each branch of fiber sensors in the spatial domain.

2. Description of the Background

There are many diverse engineering applications where determining or monitoring the shape of an article or structure is of paramount importance. The science of determining changes to the material and/or geometric properties of a structure is referred to as Structural Health Monitoring (SHM). Generally, SHM involves the observation of a structure over time using periodically sampled measurements from an array of sensors, and the analysis of these measurements to determine the current state of structural health. There are many different sensors and sensing networks for accomplishing this, but many have inherent limitations that render them unsuitable for certain applications. In the field of aeronautics, for example, traditional structural health-monitoring of aircraft wings involves the use of photogrammetry. In photogrammetry, strategic portions of the aircraft are marked beforehand and a baseline photograph is taken and calibrated to determine the initial displacement. When the wing of the aircraft is under deflection either through structural testing or at flight, wing-deflection bending is monitored by comparing pre-deflection and post-deflection photographs. However, this technique requires a clear line of sight, and oftentimes the use of any direct line-of-sight monitoring is either impossible or impractical. The same rationale holds for bridges, other concrete structures, and most any solid structure where there is no line of sight through the structure itself.

Other monitoring techniques include electrically-wired networks of strain sensors, temperature sensors, accelerometers, or the like. However, these involve complex wiring layouts which are costly and impractical, and indeed the wires tend to corrode and break with age. Electronics-based sensors are also perpetrators of electromagnetic interference (EMI) which is an undesirable byproduct in a supposedly non-invasive sensing system.

Another technique that is rapidly gaining in popularity involves fiber optic sensing networks. See, e.g., Tennyson, "Monitoring Bridge Structures Using Long Gage-Length Fiber Optic Sensors". Caltrans Bridge Research Conference (2005). Optical fiber sensors typically involve a light propagating beam which travels along an optical fiber network. Within each fiber the light is modulated as a function of strain, temperature, bending or other physical or chemical stimuli. The modulation can be analyzed in either reflection or transmission to determine the characteristic of interest. Optical fiber sensors (OFS) have many distinct advantages including immunity to electromagnetic interference, long lifetime, lightweight, small size, low cost, high sensitivity, etc. Serially multiplexed or branched OFS networks are especially suitable for SHM of large and/or distributed structures which usually need a lot of measurement points.

Optical fiber sensors (OFS) are typically composed of numerous optical fibers and numerous Fiber Bragg gratings (FBGs) periodically-spaced along the length of each fiber. Each FBG creates a periodic variation of the optical refractive index in the core of its associated optical fiber, and when coupled to an interferometer it becomes possible to detect strain individually through change in its resonant wavelength (i.e., the wavelength at which each grating has its maximum reflectance).

With optical frequency domain reflectometry (OFDR) all the FBGs are supplied with laser light having the same central wavelength, and their positions along the fiber are detected by measuring the beat frequency of any individual grating's reflection with the reflection from a reference arm of the interferometer having a known length. As the laser wavelength is scanned (where the scanning wavelength is inversely proportion to the its frequency), a small but measurable difference in the time for light to travel from the reference arm and from each grating is observed, causing variation in the interference pattern between the signal from the reference arm and the sensor arm. The frequency components of the interference pattern are linearly related to the distance along the fiber of the grating reflector. To illustrate, FIG. 1 is a perspective diagram illustrating an exemplary OFDR system without multiplexing, in which an OFDR reflectometer is optically coupled to one sensing fiber to interrogate all locations of interest. As seen at (A) sensor acquisition occurs when one continuous length of fiber is interrogated under OFDR resulting in an interference pattern presented as an "interferogram" (a graph of the variation of the output signal in the wavelength domain which encodes all beat frequencies of the sensor). As seen at (B), to obtain a sensor data that's of interest, a Fast Fourier Transform (FFT) signal-processing method is applied to convert the wavelength/frequency domain to the spatial/time domain so that the beating frequency for each FBG encoded within the interferogram can be uniquely identified via distance. The Fourier transform (FFT) of the reflected interferogram gives the Fourier impulse as a function of distance along the fiber. Thus the reflectivity of each grating can be measured. As seen in the enlarged inset of (B), to transform the wavelength (and strain) information from a particular sensor from the spatial domain back to the wavelength domain, a windowing function is first taken to lock-in the desired grating in spatial domain. Then, as seen at (C) an inverse Fourier Transform (iFFT) is taken to identify the resonant wavelength of the particular sensor. Since strain information is linearly proportional to the wavelength shift relative to the initial resonant wavelength of the fiber grating, the strain information can be obtained from the corresponding wavelength shift information.

The foregoing approach requires an un-interrupted section of fiber and is straightforward in a single-arm OFS network. However, it limits the ability to monitor different branched sections. Should any breakage occur throughout the continuous fiber the entire system is susceptible to loss of data after the breakage.

Monitoring a multiplexed or branched OFS network involving multiple fiber sensing arms each having multiple FBGs along their length is significantly more complicated. Thus, by way of example, in order to monitor three parallel fiber sections ten feet apart simultaneously, there are currently three solutions: 1) process each fiber section separately (which essentially requires multiple interferometers and computational complexity to interpret the three results); 2) join the three sections together (which adds unnecessary optical fiber increasing system cost and increases the risk of fiber breaking; or 3) multiplexing three segments into one acquisition channel.

Processing each fiber section separately is exemplified in B. Childers et al., "Use Of 3000 Bragg Grating Strain Sensors Distributed On Four Eight-Meter Optical Fibers During Static Load Tests Of A Composite Structure," Proc. of SPIE, 4332, 133-142 (2001). This article shows a four channel optical network in which data from four fiber branches was acquired simultaneously and stored in four arrays, and the raw data was processed using four computer A/D channels to yield a single strain value per FBG per laser scan.

Joining fiber arms is exemplified by U.S. Pat. No. 4,770,535 to Kim et al. issued Sep. 13, 1988 (Stanford), which shows an array of fiber-optic sensors organized in a ladder configuration which is applicable only to transmission fiber sensors since it utilizes a Mach-Zehnder setup to produce interference between each ladder. Each Mach-Zehnder interferometer acts as one sensor, which is not applicable to FBG-based sensor deployment.

Multiplexing techniques can greatly simplify the optical, electronic and computational complexity. However, it becomes necessary to distinguish each FBG along each sensor-fiber, and also to distinguish each of the parallel FBG sensor-fibers. This is difficult in the context of a Michelson interferometer system that multiplexes a network of parallel FBG sensor-fibers to a single acquisition channel. Such is a "closed" system in which a laser source is swept, and the FBGs operate in reflectance mode, reflecting light. Combining multiple FBG sensor arms results in an equal factor loss in power because optical splitter/coupler inherently loses light. In closed systems the multiplex approach can result in a "light-starved" sensor.

Multiplexing is known in open systems that rely on other interferometer types and/or other types of sensor gratings that work in transmission mode, such as long period gratings (LPGs). For example, United States Patent Application 20110273719 by Froggatt; Mark E. (Luna Innovations) discloses Optical Imaging For Optical Device Inspection using OFDR. At para [0050] a generic suggestion is made that it is possible to time-delay multiplex multiple detection fibers, creating in each detector fiber a unique delay so that each fiber has a "slot" in the total scan length in which its impulse response signal resides. However, Froggatt '3719 is confined to a fiber-optic imaging system that works in transmission mode for collecting scattered light in multiple fibers at multiple locations. Froggatt's FIG. 10 shows an example where scatter is measured from a Bragg grating using a separate collection fiber 36 in a DUT, and the time-delayed multiplexing allows the capture of more light. This approach is unsatisfactory for a system using FBGs in reflectance mode because optical combiners inherently lose light. Indeed, Froggatt suggests "Although such a loss is significant, the time delay multiplex approach may be useful in applications where the system is not "light-starved." Multiplexing a network of parallel fiber Bragg grating (FBG) sensor-fibers to a single acquisition channel of a closed Michelson interferometer system via a fiber splitter inherently results in a system that is "light-starved" and compels a different approach.

Similarly, Jiang M, Chen D, He S, "Multiplexing Scheme of Long-Period Grating Sensors Based on a Modified Optical Frequency Domain Reflectometry," IEEE PHOTONICS TECHNOLOGY LETTERS, 20(21-24), 1962-1964, November-December (2008) shows a multiplexed OFDR network with presetting of different values for the optical path differences between the measuring arms and a static reference arm. The Jiang et al technology is confined to a multiplexing scheme using long-period grating sensors (LPGs) for optical frequency domain reflectometry (OFDR) in a Mach-Zehnder interferometer.

What is needed is an alternative approach that multiplexes different sections of FBG-sensing fiber to a single acquisition channel of a Michelson interferometer in a branched-fiber network of FBGs in reflectance mode. Instead of one uninterrupted section of fiber sensors, multiple parallel fibers would be coupled together at a fiber splitter. A system and method with such features would have great utility in traditional SHM systems for most any engineering structures, and would find ready application in SHM as well as non-traditional shape sensing applications such as medical tools (e.g., flexible endoscopes and other minimally invasive surgical instruments) or other systems for monitoring and inspection.

SUMMARY OF THE INVENTION

It is, therefore, an object of the present invention to provide a method and system for multiplexing a network of parallel fiber Bragg grating (FBG) sensor-fibers to a single acquisition channel of a closed Michelson interferometer system via a fiber splitter by distinguishing each branch of fiber sensors in the spatial domain.

According to the present invention, the above-described and other objects are accomplished by multiplexing a network of parallel fiber Bragg grating (FBG) sensor-fibers to a single acquisition channel of a closed Michelson interferometer system via a unique multiplexer apparatus by distinguishing each branch of fiber sensors in the spatial domain.

The multiplexer apparatus generally comprises of one or more sensor channels, each multiplexed to multiple sensor arms by a multiplexer apparatus. Also each of the sensor arms is composed of one or more FBG sensors cascaded together. Each of the sensor arms has a known length $L_{sensor}$. Each sensor arm is connected to the multiplexer apparatus by a known length of single mode fiber with length $L_{buffer}$. Within the multiplexer apparatus each output channel includes a calibrated-length of optical fiber $L_{fiber}$. These output channel fibers are calibrated such that the fiber length of each successive output channel equals the calibrated length of the preceding channel $L_{fiber}$ plus $L_{buffer}+L_{sensor}$ of the preceding sensor arm. The known length of each sensor arm in combination with the calibrated length of each buffer fiber and multiplexer output channel effectively separates each sensor arm in the spatial domain. Thus, the sensor arms can be interrogated as part of one acquisition channel and the resulting interferogram viewed as spatially distinct segments. However, the FBG-reference arm beat frequency information for each sensor fiber is retained. The multiple sensor arms are effectively seen as one fiber having multiple segments wherein each segment can be resolved. A detailed example is herein disclosed below.

The multiplexing system and technique disclosed herein greatly simplifies optical, electronic and computational complexity, and is especially suited for use in multiplexed or branched OFS networks for SHM of large and/or distributed structures which need a lot of measurement points.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a multi-channel fiber optic sensor system (FOSS) and method for multiplexing a network of parallel fiber Bragg grating (FBG) sensor-fibers to a single acquisition channel of a closed Michelson interferometer system.

Figure 1:
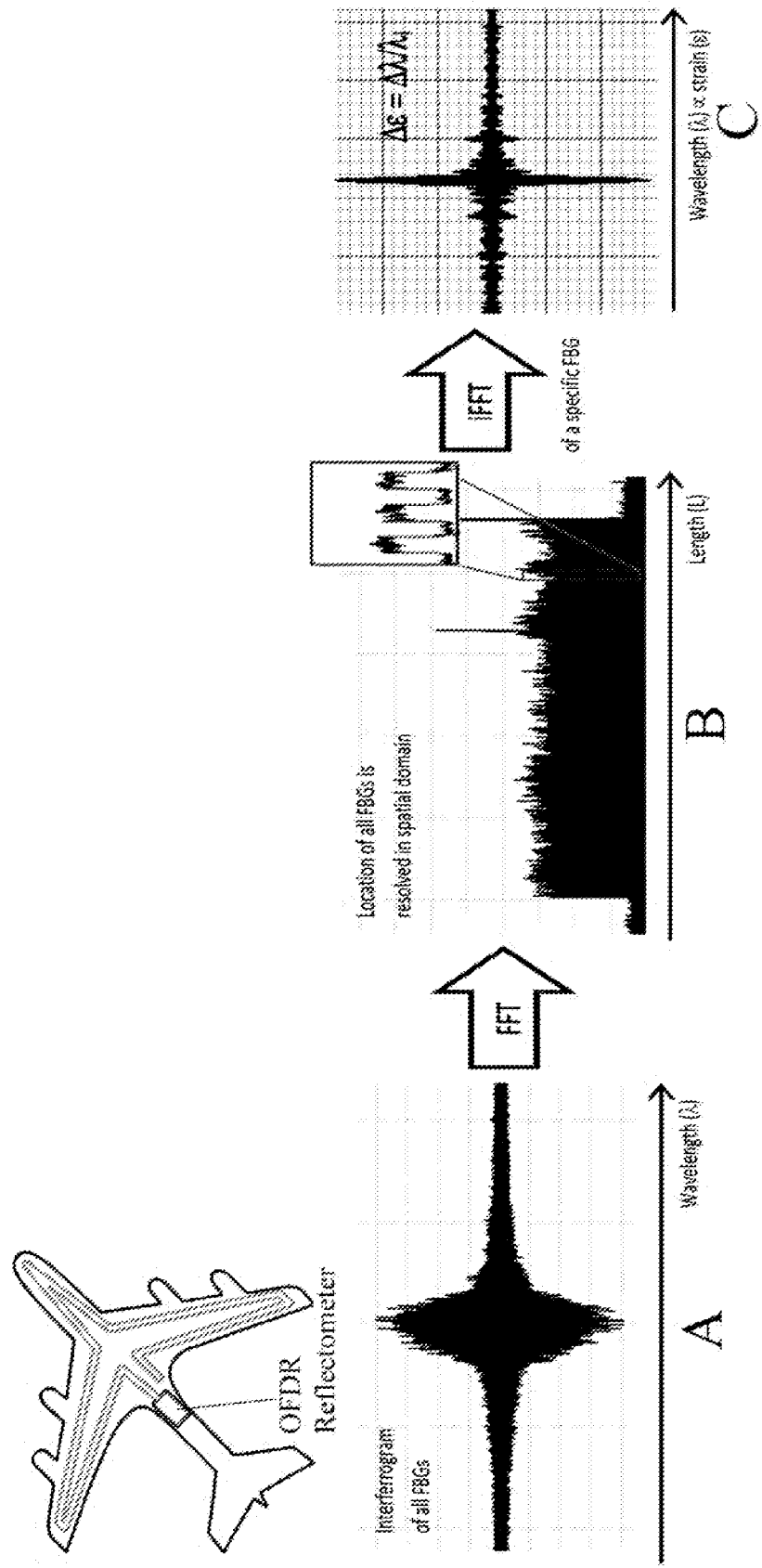
FIG. 1 is a perspective diagram illustrating an exemplary OFDR system without multiplexing, and the conventional method (A-C) of processing the OFDR data.
Figure 2:
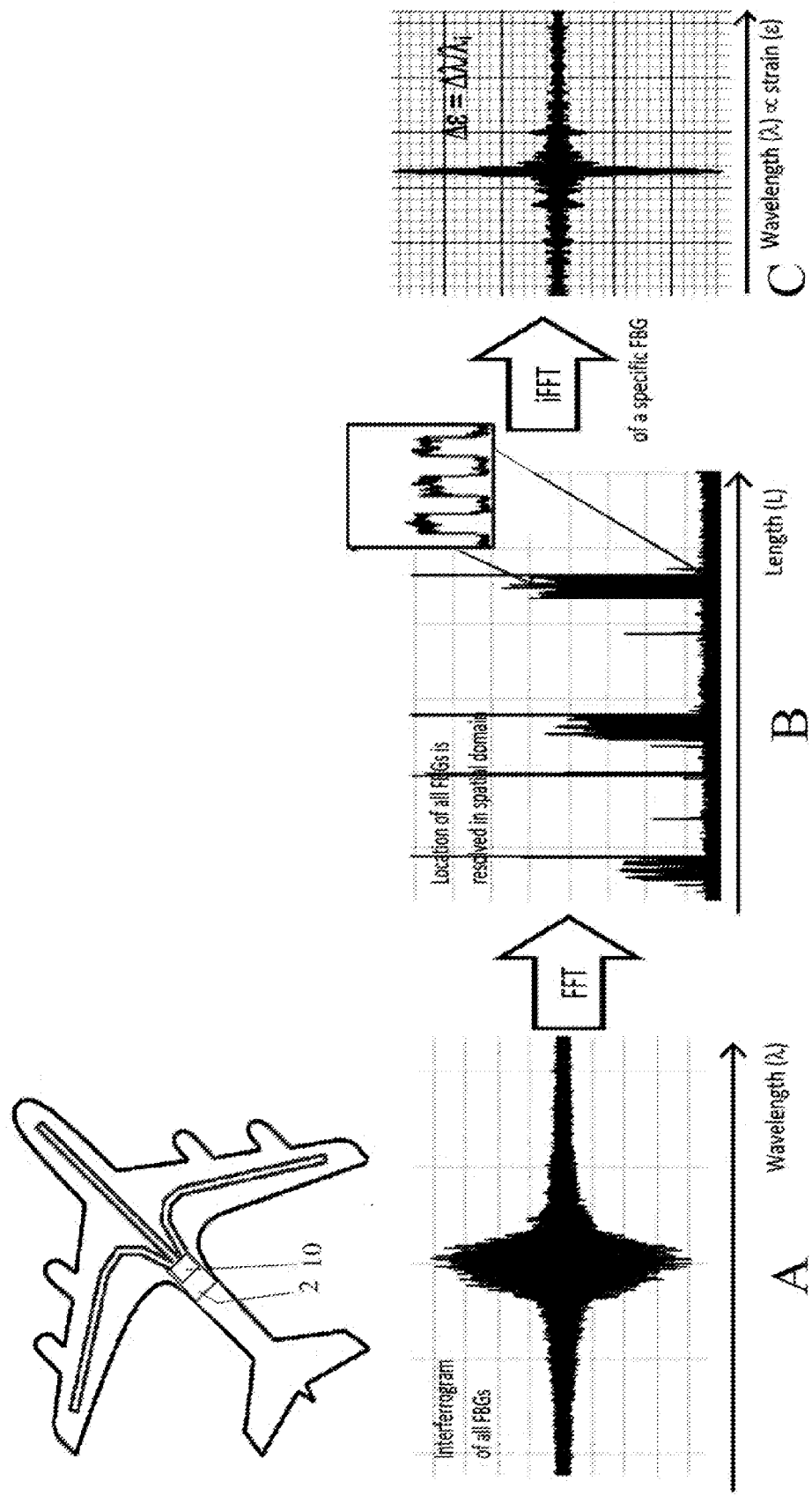
FIG. 2 is a perspective diagram illustrating an OFDR system with multiplexing according to the present invention, and the new method (A-C) of processing the OFDR data.

FIG. 2 is a perspective diagram illustrating a multi-channel FOSS 2 according to the present invention, as well as a new method (A-C) of processing the multiplexed OFDR data from the multiple sensor arms. The FOSS 2 employs a reflectometer with one or more sensing channels (one being shown), each channel being optically multiplexed to multiple parallel sensing fibers (each a "sensing arm", three of which are shown) to interrogate all locations of interest. The three sensing arms are multiplexed to one sensing channel by a multiplexer 10 which is part of the FOSS 2. As seen at (A) sensor acquisition occurs when all sensing arms are interrogated under OFDR resulting in an interferogram of all FBGs as pictured and described above. As seen at (B), to obtain singular FBG data that is of interest, a Fast Fourier Transform (FFT) signal-processing method is applied to convert the wavelength/frequency domain to the spatial/time domain so that the beating frequency for each FBG encoded within the interferogram can be uniquely identified via distance. Of course, if the different sections of sensing fiber were of equal optical length they could not be spatially resolved based on distance. Consequently, the parallel branches of sensor arms must be optically offset to effectively separate each sensing arm spatially. This is herein accomplished with a unique multiplexer apparatus 10 that imposes a unique effective fiber length to each sensing arm, each successive arm being offset to include the entire length of the preceding sensor arm. Since the beat frequency for each sensor arm is generated between a reference arm and that sensor arm, then when the effective fiber length of each sensor arm includes the entire length of the preceding sensor arm, the multiple branches can be viewed as one fiber having three defined segments, where each segment has multiple FBGs spatially positioned along its length. Each segment and FBG can be resolved in the spatial domain using one acquisition channel of the OFDR interrogation system 2, and the FBG-reference arm beat frequency information for each sensing arm is retained.

Figure 3:
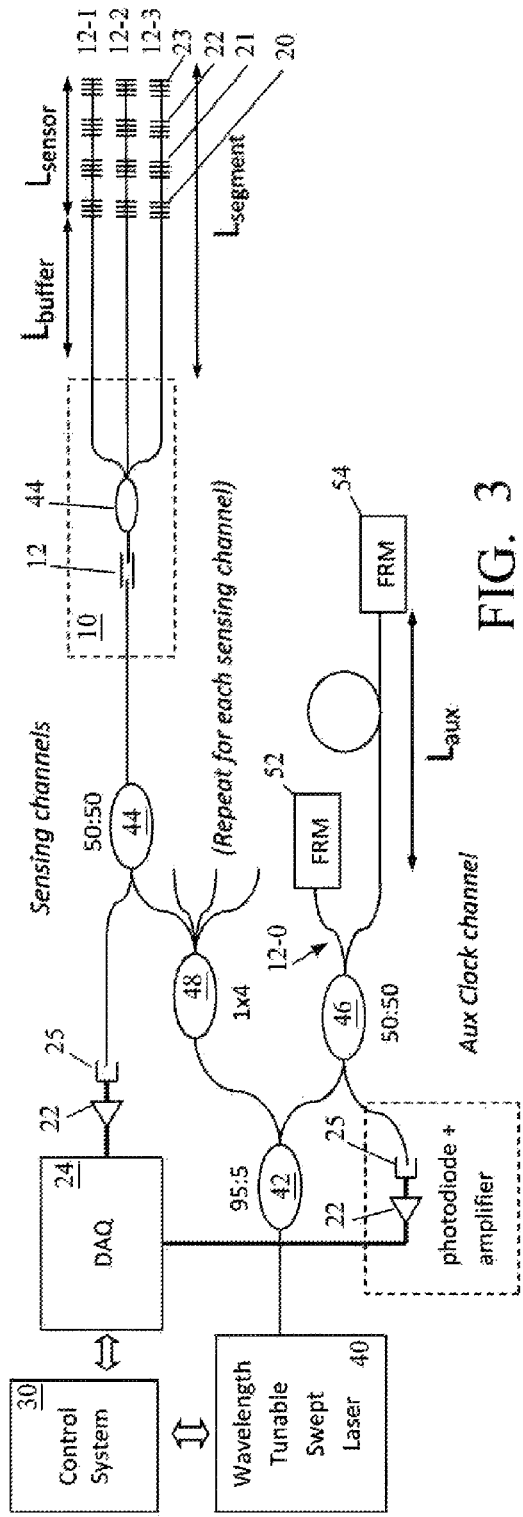
FIG. 3 is a schematic diagram of a multi-channel fiber optics sensing system (FOSS) composed of multiple acquisition channels, which employs a fiber-optic multiplexing apparatus 10 according to an embodiment of the present invention adapted for multiplexing three (3) sensing arms to one acquisition channel.

FIG. 3 is a schematic diagram of a complete multi-channel FOSS 2 implementing the above-described concept in a traditional Michelson interferometer in which a wavelength-tunable swept laser light source 40, under control of a control system 30, emits light to a beam splitter 42 that is partially reflective (here 5%) so that one beam is transmitted through a reference arm 12-0 and another beam is reflected to the sensing arms 12-1, 12-2, 12-3. Any number of sensor arms 12-1...n may be used, each containing a serial array of fiber Bragg grating (FBG) sensors 20, 21, 22, 23 arrayed along a fixed length fiber section $L_{sensor}$. All sensing arms 12-1...n are optically connected to multiplexer apparatus 10 via a fixed length of single mode fiber $L_{buffer}$ to serve as a buffer layer fiber, in advance of FBG sensors 20, 21, 22, 23. The FBGs themselves are spaced along a fixed length of fiber section $L_{sensor}$. The combined length of $L_{sensor}$ and $L_{buffer}$ equals $L_{segment}$. The multiplexer apparatus 10 further comprises an optical combiner 44 for multiplexing the sensor arms 12-1...n, and a broadband reflector 12 that establishes the interferometer with the FBG sensors 20-23. The multiplexer 10 is optically coupled through a 50:50 optical coupler 44 in order to transfer light from swept laser 40 to and from the sensing arms 12-1...n. A high-speed photo-detector 25 translates the optical signal into an electric signal, and an electric amplifier 22 is connected in series to the photo-detector 25. A dedicated analog to digital converter (DAQ) 24 transfers the analog data into digital data for the above-described Fourier transfer and inverse Fourier transfer operation. Note that any number of sensing channels, each including any number of sensor arms identical to that described, can be interrogated and fed into the DAQ 24 via a suitable optical combiner 48.

A second input to the DAQ 24 is connected via another high-speed photo-detector 25 and electric amplifier 22 to an auxiliary clock channel which provides the reference beat-length (and clock frequency) of the swept laser 40, e.g., the interval over which the Fourier Transform can be run to convert the data into the spatial domain. The auxiliary clock channel generally comprises a known Michelson configuration including a 50:50 optical coupler 46 that transfers light to and from two Faraday rotator mirrors (FRM) 52, 54 which terminate the reference arm 12-0. This configuration compensates for birefringence effects, providing a polarization-insensitive measurement technique that is immune to fringe fading of the auxiliary clock. DAQ 24 digitizes the optical return signals and outputs them to control system 30. There are a variety of FBG structures suitable for use as FBG sensors 20, 21, 22, 23, including uniform positive-only index change, Gaussian apodized, raised-cosine apodized, chirped, discrete phase shift, or superstructure, and any of the foregoing will suffice. In practice low-reflectivity FBGs are preferred for cascading hundreds of sensors without signal attenuation penalty.

In operation, the control system 30 initiates scanning of the swept laser 40. The swept laser 40 successively scans each sensing arm 12-1...n in combination with the reference arm 12-0, using the beat length generated from the length differences via the two arms generated by reflection from the Faraday reflection mirror (FRM) 52, 54, and both beams recombine at 95:5 splitter/combiner 42 to produce an interference pattern (assuming proper alignment). The optical interference is digitized at high-speed photo-detectors 25, amplified by amplifiers 22, and the digitized/amplified signals are sent to DAQ 24 which transfers the interference data to controller 30 for generation of the interferogram. As above, the optical path length of each of the three sensing arms 12-1, 12-2, 12-3 is defined by $L_{sensor}$ plus $L_{buffer}$. At each scan the beat frequency is generated between the reference arm 12-0 (distance from the laser light source 40 up to the broadband reflector 12) and the sensing arm 12-1, 12-2, 12-3 (in each case the distance from the light source 40 to a specific FBG 20, 21, 22, 23 on that particular sensing fiber). The resulting interference signal that is being captured onto photo-detector 25 is composed multiple beat frequencies. Thus, the resulting interference spectrum contains all the beat frequencies at all wavelengths. In order to interrogate each individual FBG, the control system 50 separates all the beat frequencies in all the wavelength shifts in terms of Fourier domain, where the wavelength domain is separated in to a spatial domain as seen in FIG. 2(B) and any individual FBG of interest may be isolated by windowing. As seen at (C) an inverse Fourier transfer is applied to back-convert the signal from spatial domain back to wavelength domain after windowing as mentioned above. The result of the inverse Fourier transfer will display the resonant wavelength of the specific FBG in question. One skilled in the art will understand that there are other suitable data interrogation techniques (in addition to traditional Fast Fourier Transform (FFT) and Inverse Fast Fourier Transform (IFFT)) which may be used to resolve the OFDR generated interferogram, such as but limited to short-time Fourier transform (STFT) or wavelet transformation. Regardless of the interrogation technique, the multiplexer will still display each sensor at each distinguished spatial domain.

Figure 4:
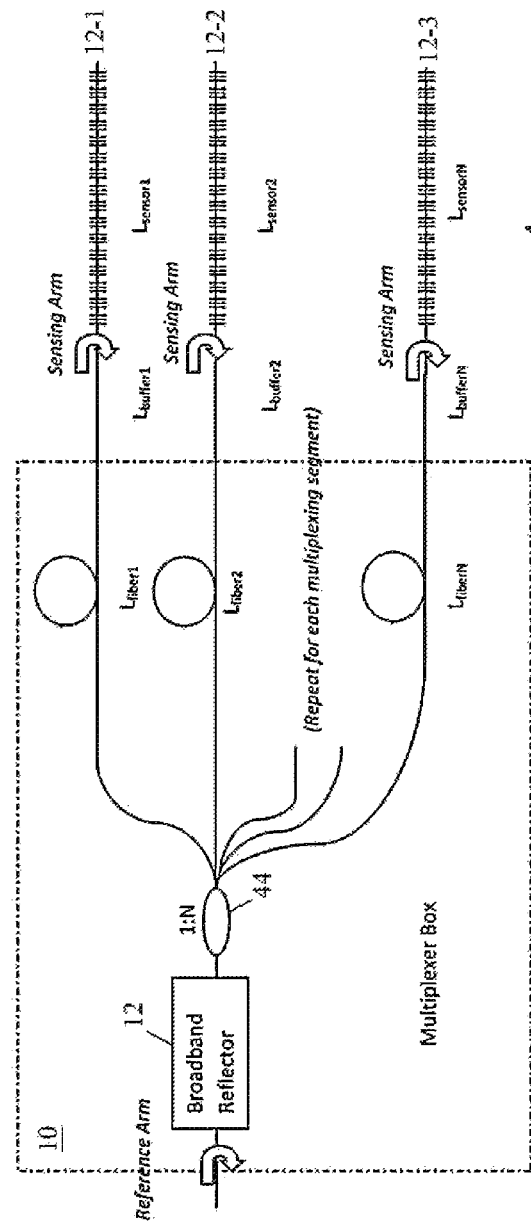
FIG. 4 is a schematic diagram of the fiber multiplexer box 10 of FIG. 3

FIG. 4 is a schematic diagram of a multi-channel multiplexer apparatus 10 according to an embodiment of the present invention, including broadband reflector 12 in optical communication with combiner/splitter 14 as described above. The broadband reflector 12 comprises a beam splitter that is partially reflective so that one beam is transmitted through reference arm (left) 12-0, and the other through the 1:3 combiner/splitter 44 to three sensing arms 12-1, 12-2, 12-3, each containing a serial array of fiber Bragg grating (FBG) sensors operating in reflectance mode to reflect a particular wavelengths of light and to transmit all others. In accordance with the present invention, the output channels of multiplexer box 10 are connected by internal fibers running from the 1:3 combiner/splitter 14 to the output port and having optical path lengths $L_{fiber1}$, $L_{fiber2}$, $L_{fiber3}$, these path lengths having calibrated optical path lengths. Furthermore, each output of the multiplexer box 10 is connected to its respective sensing arm 12-1, 12-2, 12-3 by a length of buffer fiber having a defined optical path length $L_{buffer1}$, $L_{buffer2}$, $L_{buffer3}$. As is customary each sensing arm 12-1, 12-2, 12-3 including fiber Bragg grating (FBG) sensors 20-23 has a defined optical path length $L_{sensor1}$, $L_{sensor2}$, $L_{sensor3}$. The goal of the fiber acquisition by OFDR is to distinguish each individual FBG for each specific beat frequency with respect to the reference arm 12-0 through the spatial domain via Fourier transfer as described above. The beat frequency is generated between the reference arm 12-0 (which is the distance from the light source 40 up to the broadband reflector 12) and a sensing arm 12-1, 2 or 3 (the distance from the light source 40 to a specific FBG on the sensing fiber).

The optical path length of buffer fibers $L_{buffer1}$, $L_{buffer2}$, $L_{buffer3}$ are herein pre-determined. In accordance with the present invention, the optical path length each successive output channel $L_{fiber1}$, $L_{fiber2}$, $L_{fiber3}$ within the multiplexer box 10 is calibrated to be either greater than or equal the entire length of the fiber from the previous sensor arm. Thus, for example, if the length of sensor arm 12-1 to first FBG 20 is composed of $L_{fiber1}$, $L_{buffer1}$ and $L_{sensor1}$, then the second output fiber inside the multiplexer box $L_{fiber2}$ is accorded the length $L_{fiber1}+L_{buffer1}+L_{sensor1}$. This way, the length of sensing arm 12-2 to its first FBG 20 equals $L_{fiber1}+L_{buffer1}+L_{sensor1}+L_{buffer2}+L_{sensor2}$. Similarly, $L_{fiber3}$ to first FBG 20 has the length of $L_{fiber2}+L_{buffer2}+L_{sensor2}$ (which equals $L_{fiber1}+L_{buffer1}+L_{sensor1}+L_{buffer2}+L_{sensor2}$). The length to successive FBGs 21, 22, 23 are offset accordingly.

Figure 5:
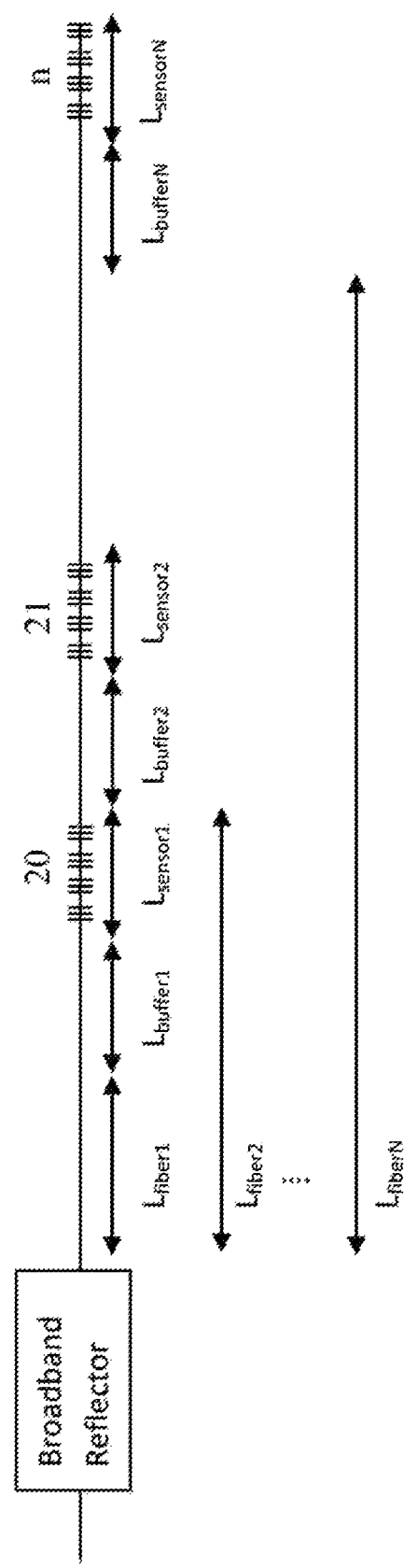
FIG. 5 is a perspective illustration showing how the different fiber segments combine together once interrogated and the interferogram is translated from wavelength domain to spatial domain.

The net effect of this arrangement is shown in FIG. 5, which is a schematic diagram illustrating how the different fiber segments combine together once interrogated and how the interferogram is translated from wavelength domain to spatial domain. The combined length of sensor arm 12-1 to first FBG 20 is composed of $L_{fiber1}+L_{buffer1}+L_{sensor1}$, to second FBG 21 is $L_{fiber1}+L_{buffer1}+L_{sensor1}+L_{buffer2}+L_{sensor2}$, and so forth. The length of sensing arm 12-2 to its first FBG 20 equals $L_{fiber1}+L_{buffer1}+L_{sensor1}+L_{buffer2}+L_{sensor2}$. Similarly, $L_{fiber3}$ to first FBG 20 has the length of $L_{fiber2}+L_{buffer2}+L_{sensor2}$ (which equals $L_{fiber1}+L_{buffer1}+L_{sensor1}+L_{buffer2}+L_{sensor2}$).

The multiplexer 10 scheme works given certain length constraints on the fiber multiplexer 10 segments $L_{fiber1}$, $L_{fiber2}$, $L_{fiber3}$, which are as follows:

1. The total summation length of the multiplexing segments $L_{fiber1}$, $L_{fiber2}$, $L_{fiber3}$ must be less than or equal to a quarter of the total length difference of the auxiliary clock length (e.g., the length difference of the aux clock channel shown in FIG. 3, which is $L_{aux}$ on the reference arm 12-0 as seen in FIG. 3), or $$\Sigma L_{segment_N} \leq \tfrac{1}{4} L_{aux}$$

2. The length of each multiplexing segment $L_{fiber1}$, $L_{fiber2}$, $L_{fiber3}$ consists of the corresponding fiber buffer length plus the sensor length, or $$L_{segment_N} = L_{buffer_N} + L_{sensor_N}$$

3. Each subsequent fiber overlay within the multiplexer box 10 must contain the length information of the previous segment lengths plus the initial fiber length, or $$L_{fiber_N} = L_{fiber1} + \sum_{i=2}^{N}\left(L_{buffer_{(i-1)}} + L_{sensor_{(i-1)}}\right)$$

The resulting interference signal that is being captured onto photo-detector 25 is composed multiple beat frequencies generated from the following: 1) a beat frequency $f_{FBG_n}$ generated between the length of each FBG and the constant length of the reference arm that has the length difference longer than $L_{buffer}$; and 2) beat frequency between each FBG in the sensing fiber within $L_{sense}$ that is smaller than $L_{buffer}$. All these beat frequencies are measured for each subsequent wavelength shift from the swept laser 40 in order to map the whole wavelength spectrum. The resulting interference spectrum contains all the beat frequencies at all wavelengths. In order to interrogate each individual FBG, the technique in OFDR usually involves two steps. Step one is to separate all the beat frequencies in all the wavelength shifts in terms of Fourier domain, where the wavelength domain is separated in to a spatial domain as per FIG. 2(B). In this domain all the beat frequencies caused by change of length L are being shown with respected to its length. To eliminate the beat frequencies between different FBGs, there exists a length $L_{buffer}$ that is equidistance from the entire $L_{sense}$ portion to ensure that in terms of spatial domain, there will not be interference between the lower beat frequencies between different FBGs. Then on the spatial domain beyond $L_{buffer}$, it becomes possible to distinguish between the specific beat frequency between each individual FBG in the spatial domain with respect to the length between the broadband reflector 12. A bandpass filter may be used as an windowing function, e.g., to filter out all but one beat frequency specific to the FBG of interest (as per FIG. 2(B) inset), and then as per FIG. 2(C) an inverse Fourier transfer is applied to back-convert the signal from spatial domain back to wavelength domain. The result of the inverse Fourier transfer will display the resonant wavelength of the specific FBG. Sensing is enabled through monitoring the change of FBGs resonant wavelength from environmental perturbation from its original wavelength.

In summary, it should now be apparent that the above-described system and method multiplexes different sections of FBG-sensing fiber to a single acquisition channel of a Michelson interferometer in a branched-fiber network of FBGs in reflectance mode. Instead of one un-interrupted section of fiber sensors, multiple parallel fibers are coupled together at a fiber splitter, and the length of the optical paths to each FBG are carefully controlled to ensure that in terms of spatial domain, there will not be interference between the lower beat frequencies between different FBGs. The present system has great utility in traditional SHM applications as well as non-traditional shape sensing applications such as medical tools (e.g., flexible endoscopes and other minimally invasive surgical instruments) or other systems for monitoring and inspection.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A method for multiplexing a network of parallel fiber Bragg grating (FBG) sensor-fibers into a single acquisition channel of a closed Michelson interferometer system having a reference arm and a plurality of sensor arms, each of said sensor arms having a known length $L_{sensor}$, comprising the steps of:

connecting each of said multiple sensor arms to a length of buffer fiber having a known optical fiber length $L_{buffer}$;

connecting all of said buffer fibers to a multiplexer box at respective output channels, each output channel comprising an internal length of optical fiber, the fiber length of a first output channel being a calibrated length $L_{fiber}$, and the fiber length of each successive output channel being greater than or equal to said calibrated length $L_{fiber}$ plus $L_{buffer}+L_{sensor}$ of the preceding output channel.

2. The method for multiplexing a network of parallel fiber Bragg grating (FBG) sensor-fibers according to claim 1, wherein the fiber length of each successive output channel is equal to said calibrated length Lfiber plus Lbuffer+Lsensor of the preceding output channel.

3. The method for multiplexing a network of parallel fiber Bragg grating (FBG) sensor-fibers according to claim 1, further comprising a step of successively scanning a beam from a tunable laser into each of said multiple sensing arms simultaneous with said reference arm and recombining reflections from each sensing arm and reference arm pair to produce an interference pattern.

4. A method for scanning a network of parallel fiber Bragg grating (FBG) sensor-fibers using a single acquisition channel of a closed Michelson interferometer, said interferometer having a swept laser source, a beam splitter, an optical fiber reference arm coupled to said beam splitter, and a plurality of branched optical fiber sensing arms all coupled to said beam splitter, each of said sensing arms further comprising a series-array of fiber Bragg gratings (FBGs) operating in reflectance mode to reflect a particular wavelengths of light and transmit all others, a first of said plurality of sensing arms being coupled to said beam splitter by an optical fiber having a predetermined length $L_1$, and a second of said plurality of sensing arms being coupled to said beam splitter by an optical fiber having a predetermined length $L_2$, where $L_2$ is greater than or equal to $L_1+N$, where N is $L_{2buffer}+L_{2sensor}$, comprising the steps of:

scanning a beam from said swept laser source into said first sensing arm and said reference arm and recombining reflections from said first sensing arm and reference arm to produce a first interference pattern;

digitizing said first interference pattern;

scanning a beam from said swept laser source into said second sensing arm and said reference arm and recombining reflections from said second sensing arm and reference arm to produce a second interference pattern;

digitizing said second interference pattern;

converting said digitized first interference pattern and digitized second interference pattern from wavelength domain to spatial domain; and distinguishing beat frequencies of individual FBGs along said second sensing arm in said spatial domain.

5. The method for scanning a network of parallel FBG sensor-fibers according to claim 4, wherein said step of distinguishing beat frequencies of individual FBGs along said second sensing arm further comprises using a bandpass filter to filter a specific beat frequency specific to a particular FBG of interest.

6. The method for scanning a network of parallel FBG sensor-fibers according to claim 4, further comprising a step of back-converting said digitized first interference pattern and digitized second interference pattern from spatial domain to wavelength domain.

* * * * *